United States Patent
Huang (10) Patent No.: US 9,612,518 B2
(45) Date of Patent: Apr. 4, 2017

(54) SCREEN AND MULTIPLE-SCREEN SYSTEM (71) Applicant: DELTA ELECTRONICS, INC., Taoyuan (TW)

(72) Inventor: June-Jei Huang, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 112 days.

(21) Appl. No.: 14/682,418

(22) Filed: Apr. 9, 2015

(65) Prior Publication Data
US 2016/0202600 A1 Jul. 14, 2016

(30) Foreign Application Priority Data

Jan. 9, 2015 (TW) .............................. 104100782 A (51) Int. Cl.
*G03B 21/625* (2014.01)

(52) U.S. Cl.
CPC .................. *G03B 21/625* (2013.01)

(58) Field of Classification Search
CPC ..... G03B 21/602; G03B 21/56; G03B 21/625
USPC ........................................ 359/449, 457, 460
See application file for complete search history.

(56) References Cited

U.S. PATENT DOCUMENTS

| 5,066,099 A * | 11/1991 | Yoshida | G03B 21/625 |
| | | | 359/453 |
| 5,206,761 A * | 4/1993 | Ogino | G03B 21/625 |
| | | | 359/457 |
| 5,485,308 A * | 1/1996 | Hirata | G03B 21/625 |
| | | | 359/457 |
| 6,912,086 B2 * | 6/2005 | Honda | G03B 21/22 |
| | | | 348/787 |
| 7,466,482 B2 * | 12/2008 | Liao | G09F 15/0068 |
| | | | 348/840 |
| 2006/0256442 A1 | 11/2006 | Hasei | |

FOREIGN PATENT DOCUMENTS

TW 200710440 A 3/2007

* cited by examiner

*Primary Examiner* — Christopher Mahoney
(74) *Attorney, Agent, or Firm* — Muncy, Geissler, Olds & Lowe, P.C.

(57) ABSTRACT

A screen is disclosed. The screen includes an angle magnifying unit and a deflecting unit. The angle magnifying unit has a first lens assembly and a second lens assembly. The first and second lens assemblies are aligned along a first direction. The first lens assembly has a plurality of first lenses, and each of the first lenses has a first radius of curvature. The second lens assembly has a plurality of second lenses, and each of the second lenses has a second radius of curvature. The magnification of the angle enlarging unit is the ratio of the first radius of curvature to the second radius of curvature. Furthermore, the deflecting unit is disposed between the first lens assembly and the second lens assembly. The deflecting unit has a plurality of deflecting prisms that aligned along a second direction. The second direction is perpendicular to the first direction.

12 Claims, 7 Drawing Sheets

SCREEN AND MULTIPLE-SCREEN SYSTEM

CROSS REFERENCE TO RELATED APPLICATIONS

This Non-provisional application claims priority under 35 U.S.C. §119(a) on Patent Application No(s). 104100782 filed in Taiwan, Republic of China on Jan. 9, 2015, the entire contents of which are hereby incorporated by reference

BACKGROUND OF THE INVENTION

Field of Invention

The invention is relative to a screen, especially relative to a screen with a projecting device.

Related Art

In recent years, with the development of flat display device, a plurality of products are applied with this technology, such as smart phones, tablet PCs, handheld game consoles, movie screens, home television, advertising TV wall and so on. The home television and advertising TV wall will have specific request for the screen size. Therefore, for satisfying the demand of large-size screen, most manufacturers can provide either a large size screen product or a plurality of screens assembled in a matrix manner for achieving large-screen effect. The large size screen requires specific processing and handling equipment. Thus, the manufacturing cost is very expensive. Therefore, most manufacturers utilize the latter way to manufacture the large-screen display devices.

According to above, if the method that multiple screens are assembled in a matrix manner is utilized, the designs of the optical path coupling of each projection device and multiple sub-images (not a whole image) according to the frames of each screens and a gap between the frames should be taken into consideration. To overcome above problems, the assembled screens of prior art modulates the width of the frames. However, narrow bezels will reduce strength of frames and protection ability. The bad visual effect according to the frame and the gap between the frames can not be effectively improved.

In view of above problems, it is an important subject to provide a screen and a multiple-screen system with a better visual effect.

SUMMARY OF THE INVENTION

In view of foregoing subject, an objective of the present invention is to provide a screen improving the visual effect of the assembled screens edges and a multi-screen system.

For achieving above objective, a screen is provided in the present invention. The screen includes an angle magnifying unit and a first deflecting unit.

The angle magnifying unit includes a first lens module and a second lens module. The first lens module and the second lens module are aligned along a first direction. The first lens module includes a plurality of first lenses. Each of the first lenses includes a first radius of curvature. The second lens module includes a plurality of second lens. Each of the second lenses includes a second radius of curvature. The magnification of the angle magnifying unit is a ratio of the first radius of curvature to the second radius of curvature.

The deflecting unit is disposed between the first lens module and the second lens module. The first deflecting unit includes a plurality of first deflecting prisms. The first deflecting prisms are aligned along a second direction. The second direction is perpendicular to the first direction.

In one embodiment, the screen further includes a diffusion unit. The diffusion unit includes a plurality of diffusion elements and the diffusion elements are aligned along a third direction that is perpendicular to the first direction and the second direction.

In one embodiment, the diffusion elements are disposed at one side of the angle magnifying unit or between the first lens module and the second lens module of the angle magnifying unit.

In one embodiment, the screen further includes a second deflecting unit, the second deflecting unit is disposed at one side of the angle magnifying unit, the second deflecting unit includes a plurality of deflecting prisms, and the second deflecting prisms are aligned along the third direction.

In one embodiment, the first deflecting unit or the second deflecting unit is a linear Fresnel lens.

In one embodiment, the screen further includes a black matrix layer disposed at one side of the second lens module far away from the first lens module.

In one embodiment, the black matrix layer is disposed on one surface of the second lens module.

A multiple-screen system is provided in the present invention. The multiple-screen system includes a plurality of projecting devices and a plurality of screens assembled adjacent to each other and disposed at a light emitting side of the projecting devices. Each of the screens includes an angle magnifying unit and a first deflecting unit.

The angle magnifying unit includes a first lens module and a second lens module. The first lens module and the second lens module are aligned along a first direction. The first lens module includes a plurality of first lenses. Each first lens includes a first radius of curvature. The second lens module includes a plurality of second lens. Each second lens includes a second radius of curvature. The magnification of the angle magnifying unit is a ratio of the first radius of curvature to the second radius of curvature.

The first deflecting unit is disposed between the first lens module and the second lens module. The first deflecting unit includes a plurality of first deflecting prisms. The first deflecting prisms are aligned along a second direction. At least two of the screens are aligned along a third direction. The first direction, the second direction and the third direction are perpendicular to each other.

In one embodiment, each of the screens further includes a diffusion unit, the diffusion unit includes a plurality of diffusion elements, and the diffusion elements are aligned along the third direction.

In one embodiment, the diffusion unit is disposed at one side of the angle magnifying unit or between the first lens module and the second lens module of the angle magnifying unit.

In one embodiment, each screen further includes a second deflecting unit, second deflecting unit is disposed at one side of the angle magnifying unit, the second deflecting includes a plurality of second deflecting prism, and the second deflecting prisms are aligned along a third direction.

In one embodiment, the first deflecting unit or the second deflecting unit is a linear Fresnel lens.

In one embodiment, each screen includes a black matrix layer disposed at a side of the second lens module far away from the first lens module.

In one embodiment, the black matrix layer is disposed on one surface of the second lens module.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
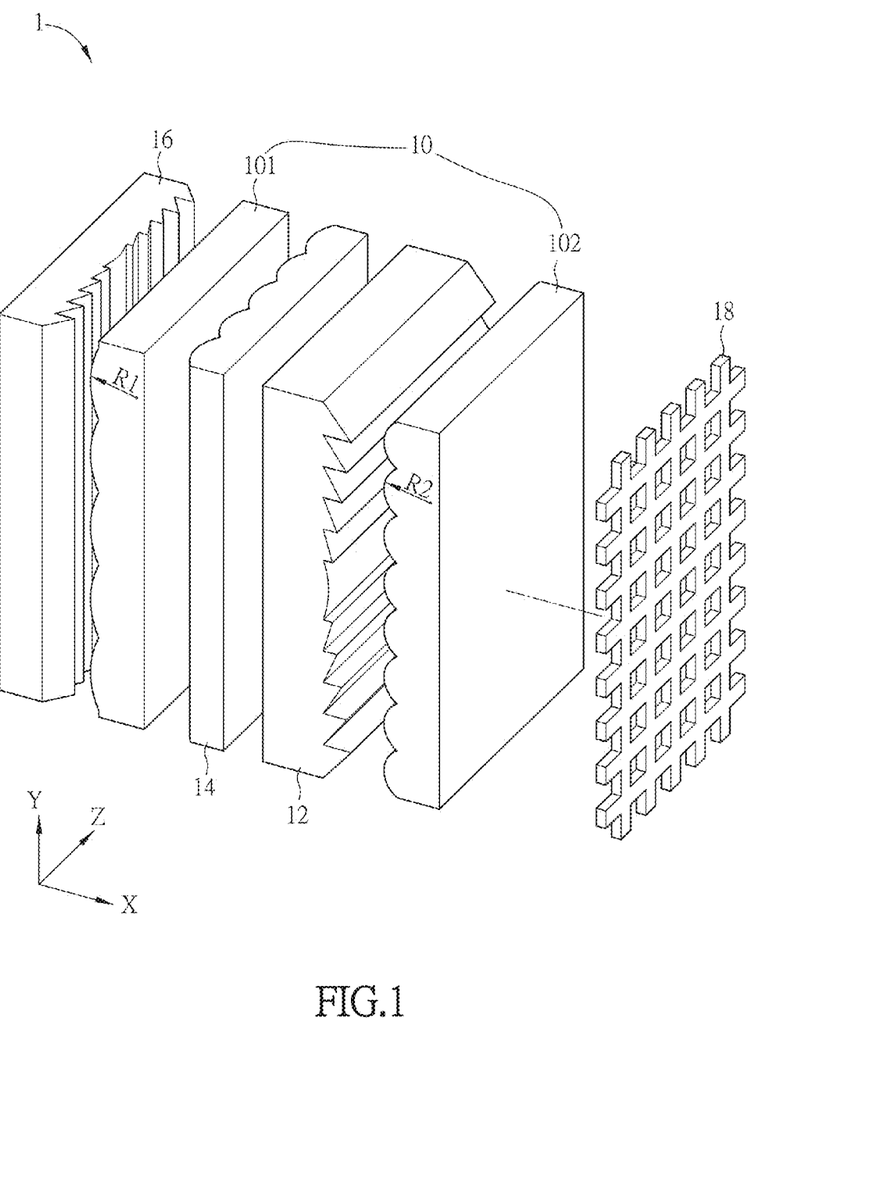
FIG. 1 is an exploded view of a screen according to the present invention.
Figure 2:
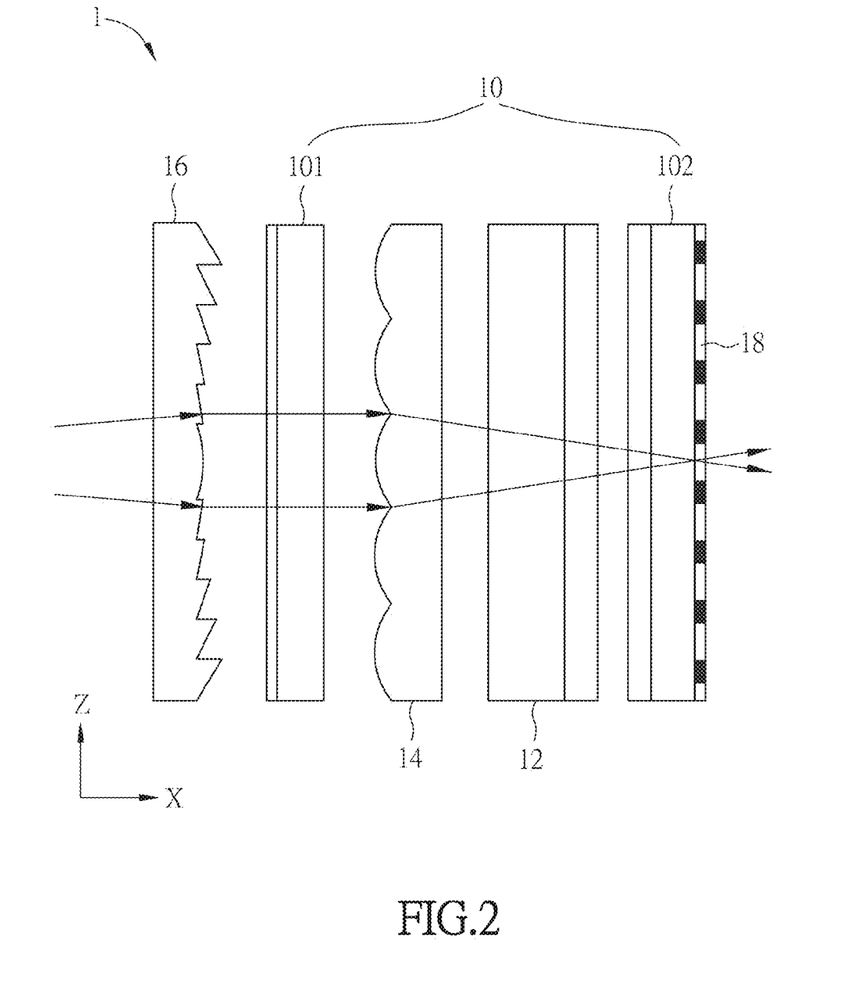
FIG. 2 is a top view of the screen of FIG. 1.
Figure 3:
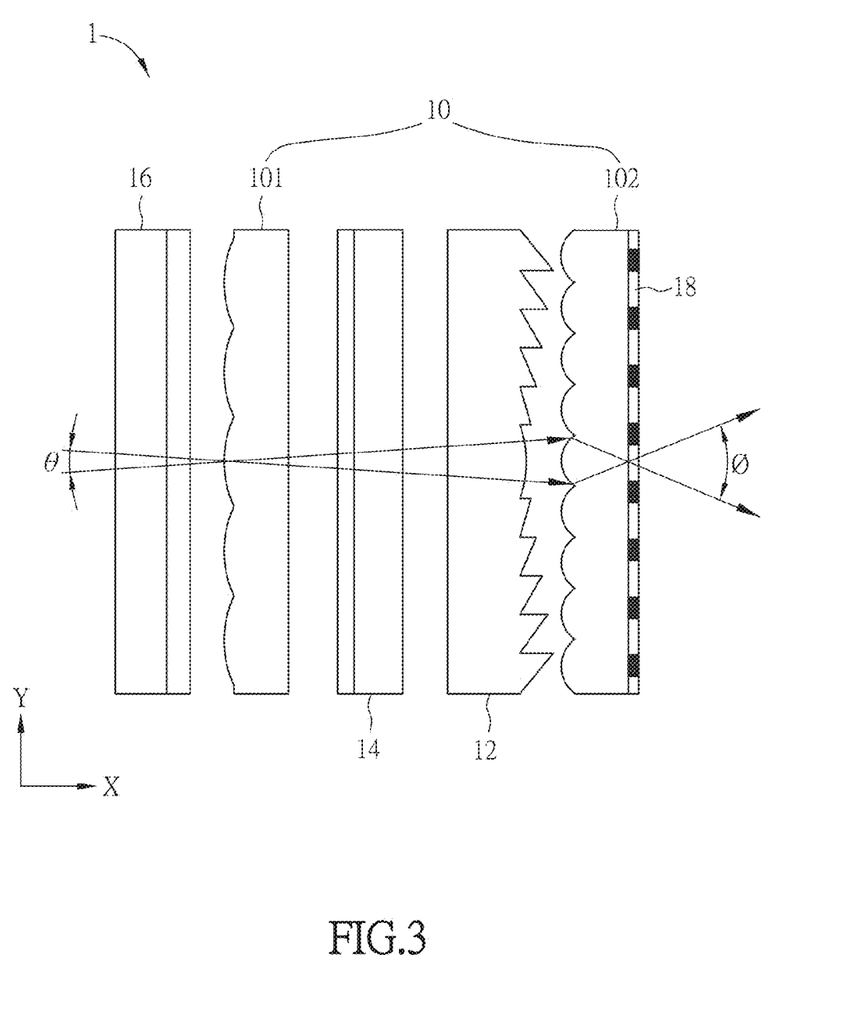
FIG. 3 is a side view of the screen of FIG. 1.
Figure 4:
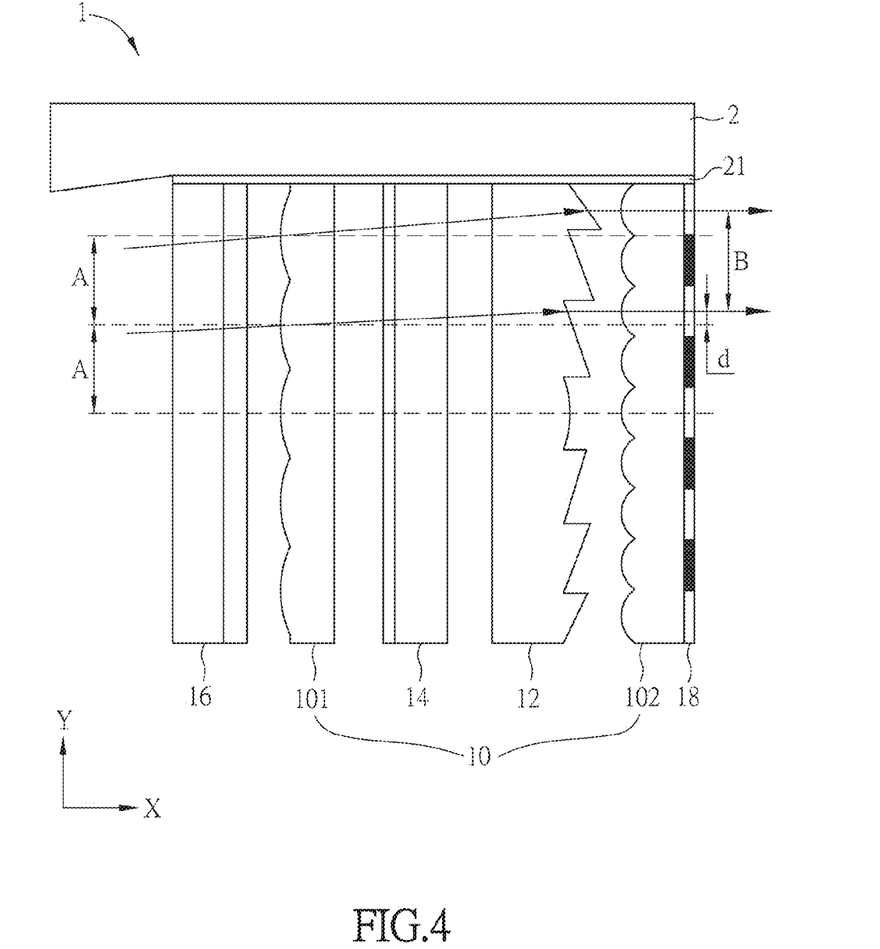
FIG. 4 is a side view of the screen of FIG. 1 cooperating with a frame.

FIG. 1 is an exploded view of a screen of the present invention. FIGS. 2 and 3 are top view and side view of the screen of FIG. 1, respectively. FIG. 4 is a side view schematic of the screen of FIG. 1 cooperating with a frame.

In the embodiment, a screen 1 includes an angle magnifying unit 10 and a first deflecting unit 12. It is especially noted, for easy understanding, the size and the details are enlarged. Therefore, the size of the drawings can not be utilized as a limitation of the present invention.

The angle magnifying unit 10 of the embodiment includes a first lens module 101 and a second lens module 102. The first lens module 101 and the second lens module 102 are aligned along a first direction (X direction). Light through the angle magnifying unit 10 can be converged by the first lens module 101 and forming an image. Then the light will be secondary imaged on the user's sight plane through the second lens module 102.

In detail, the first lens module 101 includes a plurality of first lenses. Each first lens includes a first radius of curvature R1. The second lens module 102 includes a plurality of second lenses. Each first lens includes a second radius of curvature R2. A magnification of the angle magnifying unit 10 is a ratio of the first radius of curvature R1 to the second radius of curvature R2. By modulating the first radius of curvature R1 and the second radius of curvature R2 of the magnifying unit 10, a divergence angle θ of the incident light 10 can be magnified to a divergence angle Φ. For instance, the ratio of the first radius of curvature R1 and the second radius of curvature R2 in the embodiment is 30. Therefore, the magnified divergence angle Φ is 30 times greater than the incident light 10 divergence angle θ (Φ=30*θ).

Furthermore, the first lenses of the first lens module are aligned along a second direction (Y direction). Similarly, the second lenses of the second lens module are aligned along the second direction (Y direction). The first lenses and the second lenses of the embodiment are strip lenses with same alignment direction. For instance, the angle magnifying unit 10 can be a double-layer cylindrical lens-array.

The first lens module 101 and the second lens module 102 are made of transparent material with high refractive index, such as Ultraviolet curable resin, thermosetting resin and plastic. The first lenses and the second lenses can be circular, triangular, or ellipse-shaped.

The first deflecting unit 12 is disposed between the first lens module 101 and the second lens module 102. The first deflecting unit 12 includes a plurality of first deflecting prisms. The first deflecting prisms are aligned along the second direction (Y direction). The second direction is perpendicular to the first direction. The first deflecting unit 12 is utilized to change the direction of the incident light and then the light can become parallel before transmitting into the second lens module 102. Additionally, the first deflecting unit 12 is a linear Fesnel lens.

The screen 1 of the embodiment further includes a diffusion unit 14. The diffusion unit 14 is configured for diffusing a small angle light beam into a large angle light beam and transmitting the diffused light beam to the user's sight plane. The diffusion unit 14 includes a plurality of diffusion elements. The diffusion elements are aligned along a third direction (Z direction). The third direction is respectively perpendicular to the first direction and the second direction. In the embodiment, the diffusion unit 14 can be located between the first lens module 101 and the second module 102 of the angle magnifying unit 10. The diffusion unit 14 can also be located at one side of the angle magnifying unit 10 (located on the optical path).

The screen 1 of the embodiment further includes a second deflecting unit 16. The second deflecting unit 16 is disposed at one side of the angle magnifying unit 10. The second deflecting unit 16 includes a plurality of second deflecting prisms. The second deflecting prisms are aligned along the third direction (Z direction). Moreover, an alignment type of the second prisms of the second deflecting unit 16 is the same as that of the diffusion elements of the diffusion unit 14. Each of the second deflecting prisms is located corresponding to the each diffusion elements. And the first deflecting unit 12 and the second deflecting unit 16 are utilized to deflect the light in the first direction (X direction) and third direction (Z direction) (deflecting effect is Collimation). In the embodiment, the second deflecting unit 16 can be a linear Fresnel lens or other lens.

The screen 1 of the embodiment further includes a black matrix layer 18. The black matrix layer 18 is disposed at a side of the second lens module 102 that is far away from the first lens module 101. The black matrix layer 18 is disposed on one surface of the second lens module 102. The black matrix layer 18 is a light blocking unit and consisted of a plurality of light blocking plates. The light blocking plates are strip-shaped and black. The black matrix layer 18 is disposed between pixels for light blocking, absorbing the unnecessary light and increasing overall contrast ratio of images. The black matrix layer 18 can be printed on the light emitting surface of the second lens module 102 or be an independent component. It is not limited to that as shown in figures of the embodiment.

Figure 5:
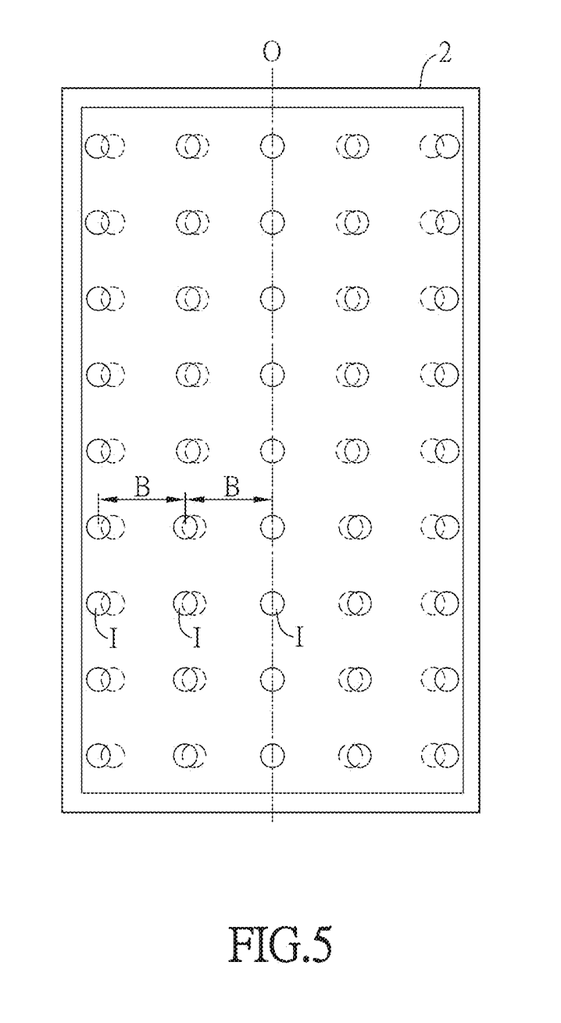
FIG. 5 is a schematic view of one of the screens according to a multiple-screen system of the present invention.

FIG. 4 is a side view of the screen of FIG. 1 cooperating with a frame. FIG. 5 is a schematic view of one of the screens of the multiple-screen system of the present invention.

Moreover, FIG. 4 is a schematic view of the screen 1 assembled with a frame 2. In the embodiment, the screen 1 and frame 2 can be assembled by adhesive. For instance, an adhesive 21 can be coated on one side of the angle magnifying unit 10 and the first deflecting unit 12. Then the frame 2 is assembled with the screen 1.

Limiting to the shape of frame 2, most frame shapes will influence the whole optical path efficient area. It means that light will be blocked by the frame 2. Thus, the first deflecting unit 12 of the embodiment is disposed between the first lens module 101 and the second lens module 102 for reducing blocking influence of the frame 2. The light will be converged by the first lens module 101, and then be deflected by the first deflecting unit 12. The light deflected by the first deflecting unit 12 is magnified by the second lens module 102, and then transmitted to the user's sight plane. In contrast, if the screen implement of the embodiment is the same as that of prior art screen, the deflecting unit will be disposed at one side of the angle magnifying unit. The light will be deflected and then magnified. Thus, the deflected light is partially blocked by the frame to reduce visual effects on the screen edges.

Additionally, because the first deflecting unit 12 is disposed between the first lens module 101 and the second lens module 102, the light is transmitted through the first lens module 101, the first deflecting unit 12 and the second lens module 102 in sequence. Then each light spot can be shifted (referring to FIGS. 4-5). In FIG. 4, the light beams incident to the screen 1 are separated into a plurality of light beams with different optical paths by the first lens module 101. Then the light beams with different optical paths will be focused at different positions by the lenses of the second lens module 102. A pitch B is disposed between two light spots (referring to FIGS. 4-5). In comparison of a pitch incident light spots A, a displacement d is disposed between the pitch B and the pitch A. In other words, after the light is deflected, a distance between the light spot and the frame 2 is decreased. For instance, in FIG. 5, a middle optical axis O of the screen 1 can be utilized as a dividing line. The light spots at the left side of the middle optical axis O have a left side displacement. The light spots at the right side of the middle optical axis O have a right side displacement. And in FIGS. 4-5, dashed line circles are symbolized as the positions of the light spots of prior art that are not shifted. For easy understanding, the black matrix layer 18 is not shown in FIG. 5.

Figure 6:
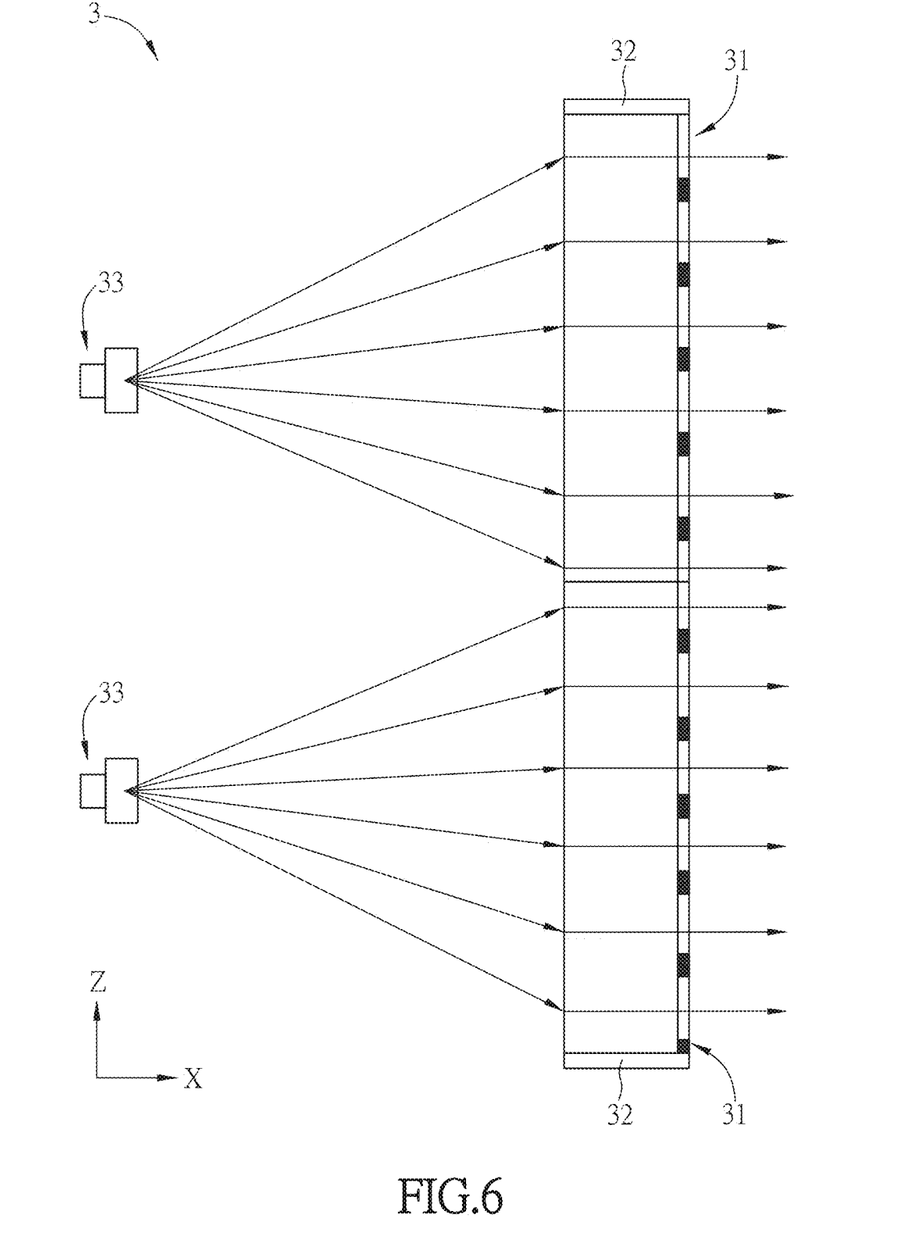
FIG. 6 is a schematic view of the multiple-screen system of the present invention.
Figure 7:
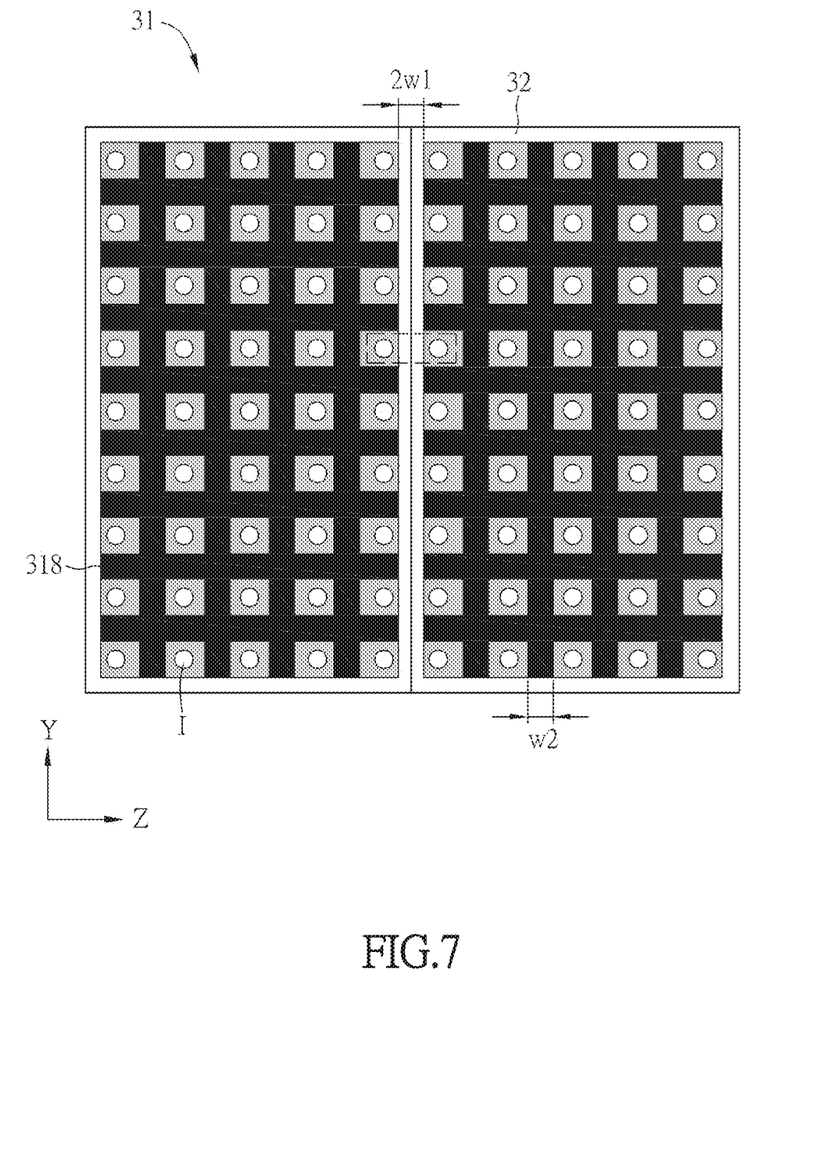
FIG. 7 is a schematic view of a screen assembled by multiple screens of FIG. 6.

FIG. 6 is a schematic diagram of the multiple-screen system of the present invention. FIG. 7 is a schematic view of a screen assembled by multiple screens of FIG. 6. It is noted that the FIG. 6 is just a schematic view for easily understanding the relationship between the projecting device and the multiple screens, not a real implementation.

In the embodiment, a multiple-screen system 3 includes a plurality of projecting device 33 and a plurality of screens 31. The screens 31 are located in a matrix manner and adjacent to each other. At least two of the screens are aligned along the third direction (Z direction). The first direction, the second direction and the third direction are perpendicular to each other. The screens 31 are located at a light emitting side of the projecting device 33. The screens 31 of the embodiment can be the screen 1 in the above description, but it is not limited to the screen 1. Please refer to the preceding paragraphs, which will not be repeated again.

The projecting device 33 can form a plurality of sight areas on the screens 31 to achieve the effect that two eyes of a user can see the adjacent sight areas, respectively. 3D images can be seen by parallax effect accordingly.

Additionally, each of the screens 31 of the embodiment respectively includes a frame 32. The frame 32 includes a width of frame w1. The frame 32 can fix components in the each screen 31 and protect the screen 31. The black matrix layer 318 of the screens 31 of the embodiment is consisted of black light-blocking plates. The black-blocking plates are strip-shaped. Each strip-shaped black light-blocking plate includes a width w2. In the embodiment, the width w2 of each strip-shaped black light blocking plate is equal to or greater than double times of the width of the adjacent frame w1 (2*w1). Thus, the frame 32 is visually similar to the black matrix layer 318 and inconspicuous. The bad visual effect of the assembled screens can be improved accordingly. The width w1 of the embodiment is 0.1 mm and the width w2 is 0.2 mm. Additionally, in another embodiment, a gap can be disposed between the two adjacent frames. In the embodiment, the width of the strip-shaped light-blocking plate is modulated as a sum of two times of the width of the frame and the width of the gap. Thus, the visual effect of this embodiment with gap can be the same as that of embodiment without gap.

Additionally, cooperating with the implementation of above embodiment, the first deflecting unit 12 is disposed between the first lens module 101 and the second lens module 102. When the light beams is transmitted through the first lens module 101, the first deflecting unit 12 and the second lens module 102 in sequence, the second lens module 102 will make the images in a diverging distribution (profile) (referring to FIGS. 4-5). As shown in FIG. 7, distributing the images in a diverging profile can make a distance between the light spots that is adjacent to the spliced area of the two screens 31 be close (dashed-frame in FIG. 7). Thus, the visual effect of the frame 32 and the black matrix layer 318 can be improved. Therefore, the users will not aware of the influence of the frame 32 assembled with the multiple-screen system 31. Then the visual effect of bezel free can be achieved.

In summary, the first deflecting unit of the embodiment is disposed between the first lens module and the second lens module of the angle magnifying unit for changing the optical path, increasing the light utilization efficiency, and modulating the distances between the images of sight areas.

Additionally, the visual effect of the multiple-screen system of the present invention can be improved by modulating the width of the strip-shaped light-blocking plate of the black matrix layer of the screen to match the width of the frame of the screen.

In view of foregoing subject, an objective of the present invention is to provide a screen and a multiple screen system to improve the visual effect at the edge of the spliced screens.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A screen comprising:
   an angle magnifying unit comprising a first lens module and a second lens module, the first lens module and the second lens module aligned along a first direction, the first lens module comprising a plurality of first lenses, each of the first lenses comprising a first radius of curvature, the second lens module comprising a plurality of second lens, each of the second lenses comprising a second radius of curvature, the magnification of the angle magnifying unit is a ratio of the first radius of curvature to the second radius of curvature;
   a first deflecting unit disposed between the first lens module and the second lens module, the first deflecting unit comprising a plurality of first deflecting prisms, the first deflecting prisms aligned along a second direction, wherein the first direction is perpendicular to the second direction; and
   a second deflecting unit disposed at one side of the angle magnifying unit, the second deflecting unit comprising a plurality of deflecting prisms, and the second deflecting prisms aligned along a third direction, wherein the third direction is perpendicular to the first direction and the second direction.

2. The screen of claim 1 further comprising a diffusion unit, the diffusion unit comprising a plurality of diffusion elements, the diffusion elements aligned along the third direction.

3. The screen of claim 2, wherein the diffusion elements are disposed at one side of the angle magnifying unit or between the first lens module and the second lens module of the angle magnifying unit.

4. The screen of claim 1, wherein the first deflecting unit or the second deflecting unit is a linear Fresnel lens.

5. The screen of claim 1 further comprising a black matrix layer disposed at one side of the second lens module far away from the first lens module.

6. The screen of claim 5, wherein the black matrix layer is disposed on one surface of the second lens module.

7. A multiple-screen system comprising:
a plurality of projecting devices; and
a plurality of screens assembled adjacent to each other and disposed at a light emitting side of the projecting devices, each of the screens comprising:
an angle magnifying unit comprising a first lens module and a second lens module, the first lens module and the second lens module aligned along a first direction, the first lens module comprising a plurality of first lenses, each first lens comprising a first radius of curvature, the second lens module comprising a plurality of second lens, each second lens comprising a second radius of curvature, the magnification of the angle magnifying unit is a ratio of the first radius of curvature to the second radius of curvature;
a first deflecting unit disposed between the first lens module and the second lens module, the first deflecting unit comprising a plurality of first deflecting prisms, the first deflecting prisms aligned along a first direction, the first direction perpendicular to the second direction; and
a second deflecting unit disposed at one side of the angle magnifying unit, the second deflecting unit comprising a plurality of deflecting prisms, and the second deflecting prisms aligned along a third direction, wherein the third direction is perpendicular to the first direction and the second direction,
wherein at least two of the screens are aligned along the third direction.

8. The multiple-screen system of claim 7, wherein the screens further comprises a diffusion unit, the diffusion comprises a plurality of diffusion elements, and the diffusion elements are aligned along the third direction.

9. The multiple-screen system of claim 8, wherein the diffusion unit is disposed at one side of the angle magnifying unit or between the first lens module and the second lens module of the angle magnifying unit.

10. The multiple-screen system of claim 7, wherein the first deflecting unit or the second deflecting unit is a linear Fresnel lens.

11. The multiple-screen system of claim 7, wherein each screen comprises a black matrix layer, the black matrix layer is disposed at a side of the second lens module that is far away from the first lens module.

12. The multiple-screen system of claim 11, wherein the black matrix layer is disposed on one surface of the second lens module.

* * * * *